United States Patent
Bhavani Shankar et al.

(10) Patent No.: US 12,122,214 B2
(45) Date of Patent: Oct. 22, 2024

(54) COOLING SYSTEM, AND A METHOD OF CONTROLLING A COOLING SYSTEM

(71) Applicant: VOLVO TRUCK CORPORATION, Gothenburg (SE)

(72) Inventors: Vijai Shankar Bhavani Shankar, Mölndal (SE); Arne Andersson, Mölnlycke (SE); Fredrik Rahm, Hörby (SE); Tove Audhav, Landvetter (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/808,144

(22) Filed: Jun. 22, 2022

(65) Prior Publication Data

US 2022/0410658 A1 Dec. 29, 2022

(30) Foreign Application Priority Data

Jun. 29, 2021 (EP) ..................... 21182459

(51) Int. Cl.
*B60H 1/00* (2006.01)
*B60H 1/03* (2006.01)
(Continued)

(52) U.S. Cl.
CPC ..... *B60H 1/00342* (2013.01); *B60H 1/00378* (2013.01); *B60H 1/00392* (2013.01);
(Continued)

(58) Field of Classification Search
CPC ............ B60H 1/00342; B60H 1/00378; B60H 1/00392; B60H 1/034; B60H 1/32281;
(Continued)

(56) References Cited

U.S. PATENT DOCUMENTS 5,507,153 A 4/1996 Seto et al.
9,827,846 B2 * 11/2017 Porras .................. B60K 11/085
(Continued)

FOREIGN PATENT DOCUMENTS

CN 109941116 A * 6/2019 ......... B60H 1/00921
CN 110053451 A 7/2019
(Continued)

OTHER PUBLICATIONS

Extended European Search Report in corresponding European Application No. 21182459.4 dated Dec. 13, 2021 (8 pages).

*Primary Examiner* — Ljiljana V. Ciric
(74) *Attorney, Agent, or Firm* — Venable LLP; Jeffri A. Kaminski

(57) ABSTRACT

A cooling system for a vehicle propelled by an electric machine. The cooling system is arranged, when the vehicle is operated in a braking mode, to control a first and a second radiator valve to direct a flow of fluid from a radiator through a first fluid circuit and prevent the flow of fluid from the radiator to enter the second fluid circuit, control a compressor arrangement to flow a refrigerant in a direction from a heat exchanger to a condenser of a third fluid conduit, and control a second circuit valve arrangement to direct a heat source fluid to circulate through a heat exchanger and an electric heat source.

12 Claims, 6 Drawing Sheets

(51) Int. Cl.
*B60H 1/32* (2006.01)
*B60L 7/10* (2006.01)
*B60L 7/22* (2006.01)
*B60L 58/15* (2019.01)
*B60L 58/40* (2019.01)
*H01M 10/613* (2014.01)
*H01M 10/625* (2014.01)
*H01M 10/63* (2014.01)
*H01M 10/6568* (2014.01)
*H01M 10/66* (2014.01)

(52) U.S. Cl.
CPC ......... *B60H 1/034* (2013.01); *B60H 1/32281* (2019.05); *B60L 7/10* (2013.01); *B60L 7/22* (2013.01); *B60L 58/15* (2019.02); *B60L 58/40* (2019.02); *H01M 10/613* (2015.04); *H01M 10/625* (2015.04); *H01M 10/63* (2015.04); *H01M 10/6568* (2015.04); *H01M 10/66* (2015.04); *B60L 2200/36* (2013.01); *B60L 2240/36* (2013.01)

(58) Field of Classification Search
CPC .............. B60H 1/3205; B60H 1/00385; B60H 1/32284; B60L 7/10; B60L 7/22; B60L 58/15; B60L 58/40; B60L 2200/36; B60L 2240/36; H01M 10/613; H01M 10/625; H01M 10/63; H01M 10/6568; H01M 10/66
See application file for complete search history.

(56) References Cited

U.S. PATENT DOCUMENTS

| | | | | |
|---|---|---|---|---|
| 9,947,975 | B2 * | 4/2018 | Porras | H01M 10/625 |
| 9,950,638 | B2 * | 4/2018 | Porras | B60H 1/00921 |
| 10,166,841 | B2 * | 1/2019 | Larson | B60H 1/3207 |
| 10,220,722 | B2 * | 3/2019 | Lewis | B60K 6/40 |
| 10,293,658 | B2 * | 5/2019 | Porras | H01M 10/625 |
| 10,293,706 | B2 * | 5/2019 | Porras | B60H 1/00385 |
| 10,336,158 | B2 * | 7/2019 | Ragazzi | B60H 1/034 |
| 10,340,563 | B2 * | 7/2019 | Blatchley | H01M 10/635 |
| 10,457,111 | B2 * | 10/2019 | Gebbie | B60H 1/00278 |
| 10,493,819 | B2 * | 12/2019 | Zenner | B60H 1/00271 |
| 10,543,735 | B2 * | 1/2020 | Colavincenzo | B60L 58/15 |
| 10,906,377 | B2 * | 2/2021 | Zenner | B60H 1/00328 |
| 10,994,587 | B2 * | 5/2021 | Zenner | B60H 1/143 |
| 11,041,424 | B2 * | 6/2021 | Jiang | F01P 7/14 |
| 11,130,384 | B2 * | 9/2021 | Conti | B60H 1/00392 |
| 11,342,603 | B2 * | 5/2022 | Tomai | B60L 58/25 |
| 11,370,325 | B2 * | 6/2022 | Durrani | B60L 58/26 |
| 11,731,482 | B2 * | 8/2023 | Huang | B60K 1/04 |
| | | | | 165/202 |
| 2004/0000161 | A1 | 1/2004 | Khelifa et al. | |
| 2005/0061497 | A1 * | 3/2005 | Amaral | B60H 1/00899 |
| | | | | 165/202 |
| 2010/0273079 | A1 | 10/2010 | Hinsenkamp et al. | |
| 2016/0344075 | A1 | 11/2016 | Blatchley et al. | |
| 2019/0299738 | A1 * | 10/2019 | Conti | B60H 1/00278 |
| 2023/0102528 | A1 * | 3/2023 | Larsson | F16D 61/00 |
| | | | | 62/434 |

FOREIGN PATENT DOCUMENTS

| | | | | |
|---|---|---|---|---|
| CN | 113459762 | B * | 8/2023 | |
| DE | 102019107479 | A1 | 10/2019 | |
| DE | 102019100096 | A1 | 7/2020 | |
| EP | 4155142 | A1 * | 3/2023 | ......... B60H 1/00271 |
| GB | 2555475 | A * | 5/2018 | ......... B60H 1/00271 |
| JP | 2023059106 | A * | 4/2023 | |

* cited by examiner

COOLING SYSTEM, AND A METHOD OF CONTROLLING A COOLING SYSTEM

TECHNICAL FIELD

The present invention relates to a cooling system for a vehicle propelled by an electric machine. The present invention also relates to a method of controlling a cooling system as well as a vehicle comprising such a cooling system. Although the invention will mainly be directed to a vehicle in the form of a truck using a fuel cell for generating electric power to an electric traction motor, the invention may also be applicable for other types of vehicles propelled by an electric machine, such as e.g. an electric vehicle receiving electric power from a battery charged from the electric power grid, a hybrid vehicle comprising an electric machine as well as an internal combustion engine for propulsion, etc. The invention is also applicable for e.g. vehicles in the form of working machines, buses, cars, etc.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

Vehicles propelled by electric machines often struggles with energy management for dissipating excess energy during particular operating conditions, since the vehicle electrical storage system at times may not be able to receive additional electric energy. Such situation may, for example, be during a regenerative braking event where the electrical storage system is not able to receive further electric energy because the State-Of-Charge (SOC) level of the battery is above a predetermined threshold limit. In such situations the energy must be controlled in another manner.

At the same time, the components included in the electric power system is in need of controllable cooling during operation.

It is therefore a desire to provide a cooling system of an electrically propelled vehicle which comprises sophisticated energy dissipation management.

SUMMARY

It is thus an object of the present invention to at least partially present a solution to the above described desires.

According to a first aspect, there is provided a cooling system for a vehicle propelled by an electric machine, wherein the cooling system comprises a radiator configured to receive ambient air, the radiator comprises a radiator inlet connected to a first radiator valve, and a radiator outlet connected to a second radiator valve, a first fluid circuit comprising a first pump and a heat generating arrangement, the first fluid circuit being arranged in fluid communication between the first radiator valve and the second radiator valve, a second fluid circuit arranged in fluid communication between the first radiator valve and the second radiator valve, the second fluid circuit comprising an electric heat source, and a second circuit valve arrangement arranged in fluid communication between the electric heat source and the inlet of the radiator, and a third fluid circuit configured to contain a refrigerant fluid, the third fluid circuit comprising a condenser configured to exchange heat with ambient air, a heat exchanger, and a compressor arrangement, wherein the heat exchanger is fluidly connected to the second circuit valve arrangement and to the second fluid circuit at a position between the electric heat source and the outlet of the radiator, wherein the cooling system further comprises a control unit connected to the first radiator valve, the second radiator valve, the second circuit valve arrangement and to the compressor arrangement, the control unit comprising control circuitry configured to: receive a signal indicative of a vehicle operation mode, and when the vehicle operation mode is a vehicle braking mode: control the first and second radiator valves to direct a flow of fluid from the radiator through the first fluid circuit and prevent the flow of fluid from the radiator to enter the second fluid circuit, control the compressor arrangement to flow the refrigerant in a direction from the heat exchanger to the condenser, and control the second circuit valve arrangement to direct a heat source fluid to circulate through the heat exchanger and the electric heat source.

The heat generating arrangement should in the following be construed as an arrangement configured to generate heat. According to an example embodiment, the heat generating arrangement may be one of an electric resistor, a retarder and a heat exchanger. Preferably, the heat generating arrangement is connected the electric source, or to another electrical storage system of the vehicle. The heat generating arrangement is in such a case an electrical heat generating arrangement and is, during the vehicle braking mode, configured to dissipate electric power to the fluid flow in the first fluid circuit. Furthermore, the condenser may preferably be positioned to exchanged heat with ambient air received from the radiator. The ambient air is here directed through the radiator and thereafter to the condenser.

Further, the electric heat source can be, for example, a battery, an inverter, ultracapacitor, resistor, or other electrical storage or conversion devices, etc. According to another example embodiment, the electric heat source may be a fuel cell system. The fuel cell system may preferably comprise one or more fuel cell stacks arranged to generate electric power. The electric power is preferably used for operating the electric machine propelling the vehicle. The fuel cell may be connected directly to the electric machine, i.e. transmitting the generated electric power directly to the electric machine. The fuel cell may also be connected to an energy storage system, which in turn is connected to the electric machine. Thus, the electric power generated in the fuel cell is transmitted to the energy storage system, whereby the electric power is thereafter transmitted to the electric machine. The energy storage system may, for example, be a battery comprising one or more battery modules.

Still further, the vehicle braking mode should be construed as an operating condition of the vehicle when the vehicle is reducing the vehicle speed, or when the vehicle is braking for maintaining a desired vehicle speed. The latter case may, for example, be an operating condition where the vehicle is driving at a downhill slope and there is a desire to maintain a desired steady vehicle speed. If not braking in such situation, the downhill slope will make the vehicle increase its vehicle speed. The vehicle braking mode is preferably a mode at which auxiliary braking is performed.

Moreover, the control unit may include a microprocessor, microcontroller, programmable digital signal processor or another programmable device. The control unit may also, or instead, include an application specific integrated circuit, a programmable gate array or programmable array logic, a programmable logic device, or a digital signal processor.

Where the control unit includes a programmable device such as the microprocessor, microcontroller or programmable digital signal processor mentioned above, the processor may further include computer executable code that controls operation of the programmable device. Although not described above, the control unit may also be connected to additional components of the cooling system for controlling operation thereof. For example, the control unit may also be connected to the first pump.

By means of the cooling system of the present invention, the flow of fluid can be controlled to pass through the heat generating arrangement of the first fluid circuit during the vehicle braking mode. Hereby, electrical power can be dissipated during the braking operating mode and the heat generating arrangement is operated to brae the vehicle speed. By dissipating electrical power will hereby enhance the cooling capacity for the vehicle during braking. The cooling system of the present invention is thus able to decouple the electric heat source and the heat generating arrangement from each other. The electric heat source and the heat generating arrangement are thus arranged in parallel and, compared to a serial connection, enables for improved temperature control of these two components. In further detail, the electric heat source and the heat generating arrangement are thus able to operate at different thermal potentials whereby optimization of the temperature levels of various components can be improved.

According to an example embodiment, the compressor arrangement may comprise a reversing valve arrangement connected to the control unit, wherein the reversing valve arrangement is arranged in the third fluid circuit in fluid communication between the heat exchanger and the condenser. The reversing valve arrangement is advantageously operable to direct the refrigerant in different directions of the third fluid conduit. In further detail, the reversing valve arrangement can direct the refrigerant in a direction from the heat exchanger to the condenser, or in the opposite direction from the condenser to the heat exchanger. An advantage of using a reversing valve arrangement is that the compressor can be made less complex, since the flow direction of refrigerant is solely controlled by means of the reversing valve arrangement.

According to an example embodiment, the control circuitry may, when the vehicle operation mode is a vehicle start-up mode, be further configured to control the first and second radiator valves to be arranged in a closed position, respectively, to prevent the flow of fluid from the first and second fluid circuits to flow into the radiator, control the compressor arrangement to flow the refrigerant in a direction from the condenser to the heat exchanger, and control the second circuit valve arrangement to direct the fluid contained in the second circuit conduit to circulate through the heat exchanger and the electric heat source.

The vehicle start-up mode should be understood as a mode where the vehicle is started after having been standing still for a predetermined time period. The vehicle start-up mode may also relate to a situation where the electric heat source has a relatively low temperature and is in need of heating for being able to operate at an optimum operation point. The control unit may thus receive a signal indicative of a current temperature level of the electric heat source, and control the cooling system to operate the start-up mode when the current temperature level of the electric heat source is below a predetermined threshold temperature limit.

An advantage is thus that the electric heat source is heated by means of the heated refrigerant supplied to the heat exchanger from the condenser. The second and third fluid circuits forms closed circuit during the vehicle start-up mode. An advantage of disconnecting the first fluid circuit is that the heat to the electric heat source can be used more efficiently since the thermal mass otherwise required through the first fluid circuit is decoupled. The cooling system is hereby arranged to heat up a less number of components and the electric heat source can be heated more rapidly.

According to an example embodiment, the cooling system may further comprise a fluid tank fluidly connected to the second circuit valve arrangement. According to an example embodiment, the control circuitry may be further configured to control the second circuit valve arrangement to direct a flow of fluid from the fluid tank to the heat exchanger during the vehicle start-up mode. The heat exchanger is hereby supplied with a fluid that can be heated by the refrigerant fluid, and then circulated through the electric heat source.

According to an example embodiment, the third fluid conduit may further comprise an expander arranged in fluid communication between the condenser and the heat exchanger, the expander being arranged on an opposite side of the heat exchanger compared to the compressor arrangement.

An advantage of an expander is that it can facilitate an expansion of the refrigerant, thereby lowering the pressure level of the refrigerant as well as the temperature potential. Thus, in the vehicle braking mode, the temperature level of the refrigerant supplied to the heat exchanger from the condenser is reduced in the expander. In a similar vein, the temperature of the refrigerant supplied to the condenser from the heat exchanger is reduced during the vehicle start-up mode.

According to an example embodiment, the second fluid circuit may further comprise a heat source pump arranged in fluid communication between the electric heat source and the second circuit valve arrangement. The heat source pump should hence be construed as a pump arranged to assist in directing the fluid exhausted from the electric heat source towards the second circuit valve arrangement. The heat source pump preferably increases the pressure level of the fluid exhausted from the electric heat source.

According to an example embodiment, the first pump may be arranged in fluid communication between the heat generating arrangement and the second radiator valve.

According to an example embodiment, the second circuit valve arrangement may be a three-way valve arranged to controllably direct the heat source fluid from the electric heat source to the first radiator valve and/or to the heat exchanger.

According to an example embodiment, the second fluid circuit may further comprise an additional valve arrangement connected between the electric heat source and the heat generating arrangement, wherein the heat generating arrangement is further connected to the second circuit valve arrangement. According to an example embodiment, the control circuitry may, when the vehicle operation mode is the vehicle start-up mode, be further configured to control the additional valve arrangement to direct the heat source fluid from the electric heat source to circulate through the heat exchanger via the heat generating arrangement.

An advantage is that the fluid in circulating through the heat exchanger and the electric heat source can be directed also through the heat generating arrangement during the vehicle start-up mode. Hereby, the heat generating arrangement can assist in increasing the temperature level of the electric heat source, thereby improving the heating process.

According to an example embodiment, the cooling system may further comprise a pressurized coolant tank connected to at least one of the first fluid circuit and the second fluid circuit.

According to an example embodiment, the pressurized coolant tank may be configured to supply a flow of pressurized coolant flow to the first fluid circuit when the pressurized coolant tank is connected to the first fluid circuit and when the control circuits receives the signal indicative of the vehicle braking mode, the flow of pressurized coolant flow is provided to the first fluid circuit at a position upstream the heat generating arrangement.

Preferably, the pressurized coolant tank is connected to the first fluid circuit at a position between the second radiator valve and the first pump. Thus, the pressurized coolant flow from the pressurized coolant tank is supplied into the first fluid circuit, and thereafter further directed through the first pump and further to the heat generating arrangement.

According to an example embodiment, the first fluid circuit may comprise a first fluid circuit valve arranged in fluid communication between the heat generating arrangement and the first radiator valve, the first fluid circuit valve comprising an adjustable diameter for controlling a pressure level in the first fluid circuit. Hereby, the pressure level of the fluid in the first fluid circuit can be controlled, i.e. increased when desired.

According to an example embodiment, the second circuit valve arrangement may be further connected to the first fluid circuit arrangement at a position between the heat generating arrangement and the first radiator valve. This is particularly advantageous during the vehicle braking mode, at which the third fluid circuit can assist in reducing the temperature level of the heat generating arrangement. Hereby, a heat rejection capacity of the heat generating arrangement can be increased.

According to an example embodiment, the cooling system may further comprise a heat exchanger valve arranged to fluidly connect the heat exchanger to the electric heat source and to the first fluid conduit, the heat exchanger valve being connected to the first fluid circuit at a position between the second radiator valve and the heat generating arrangement. The fluid directed through the heat exchanger can hereby be directed to either the electric source or to the first fluid circuit. Accordingly, and according to an example embodiment, the control circuit may, when the vehicle operation mode is the vehicle braking mode, be configured to control the second circuit valve arrangement to direct a portion of the flow of fluid from the heat generating arrangement to the heat exchanger, and control the heat exchanger valve to exhaust the portion of the flow of fluid to the first fluid circuit.

According to a second aspect, there is provided a method of controlling a cooling system connected to a vehicle propelled by an electric machine, the cooling system comprising a radiator configured to receive ambient air, the radiator comprises a radiator inlet connected to a first radiator valve, and a radiator outlet connected to a second radiator valve, a first fluid circuit comprising a first pump and a heat generating arrangement, the first fluid circuit being arranged in fluid communication between the first radiator valve and the second radiator valve, a second fluid circuit arranged in fluid communication between the first radiator valve and the second radiator valve, the second fluid circuit comprising an electric heat source and a second circuit valve arrangement arranged in fluid communication between the electric heat source and the inlet of the radiator, and a third fluid circuit containing a refrigerant, the third fluid circuit comprising a condenser configured to exchange heat with ambient air, a heat exchanger, a compressor arrangement, wherein the heat exchanger is fluidly connected to the second circuit valve arrangement and to the second fluid circuit at a position between the electric heat source and the outlet of the radiator, wherein the method comprises determining a vehicle operation mode, and when the vehicle operation mode is a vehicle braking mode: directing a flow of fluid from the radiator through the first fluid circuit and preventing the flow of fluid from the radiator to enter the second fluid circuit, directing the refrigerant in a direction from the heat exchanger to the condenser, and directing a heat source fluid to circulate through the heat exchanger and the electric heat source.

Effects and features of the second aspect are largely analogous to those described above in relation to the first aspect. Thus, any embodiment or feature described above in relation to the first aspect can be combined with the method of the second aspect.

According to a third aspect, there is provided a vehicle comprising a cooling system according to any one of the embodiments described above in relation to the first aspect.

According to a fourth aspect, there is provided a computer program comprising program code means for performing the steps of the method described above in relation to the second aspect when the program code means is run on a computer.

According to a fifth aspect, there is provided a computer readable medium carrying a computer program means for performing the steps of the method described above in relation to the second aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
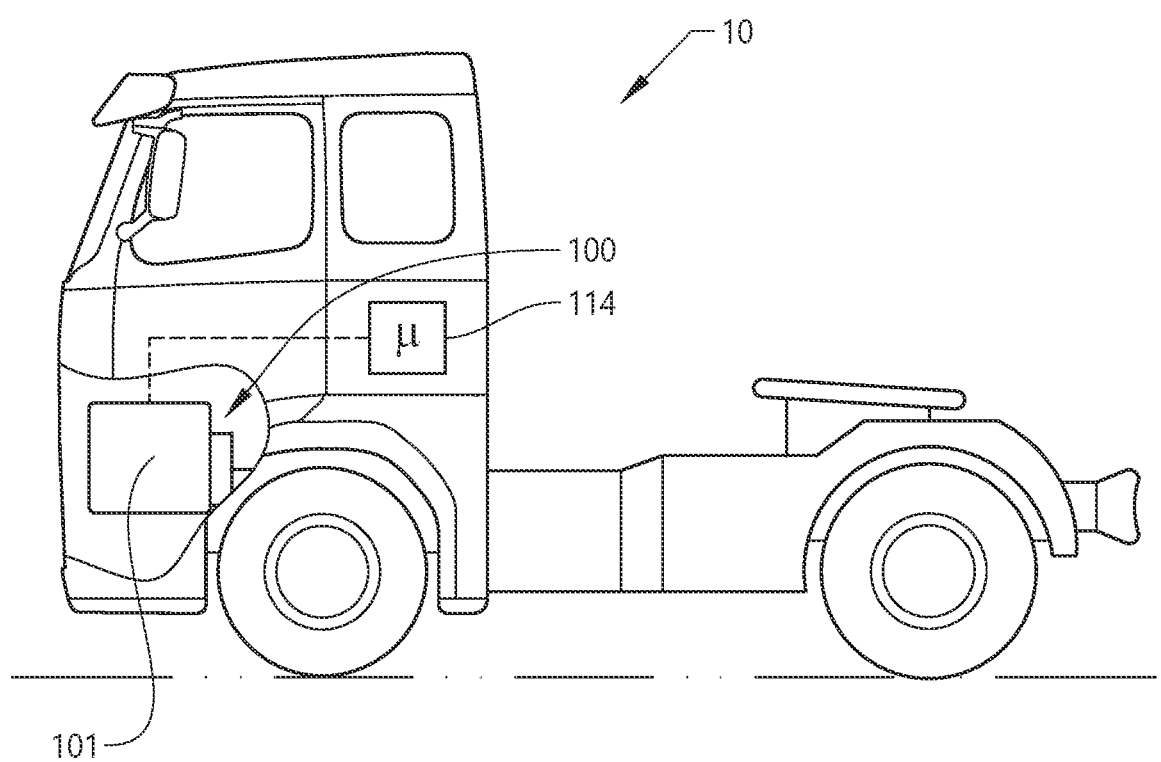
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric machine 101 arranged to receive electric power from a battery or directly from a fuel cell system. The vehicle 10 also comprises a control unit 114 for controlling various operations as will also be described in further detail below, and a cooling system (not shown in detail in FIG. 1) arranged to control the temperature level of the battery/fuel cell system and to dissipate electric energy for obtaining an auxiliary braking action for the vehicle.

Figure 2:
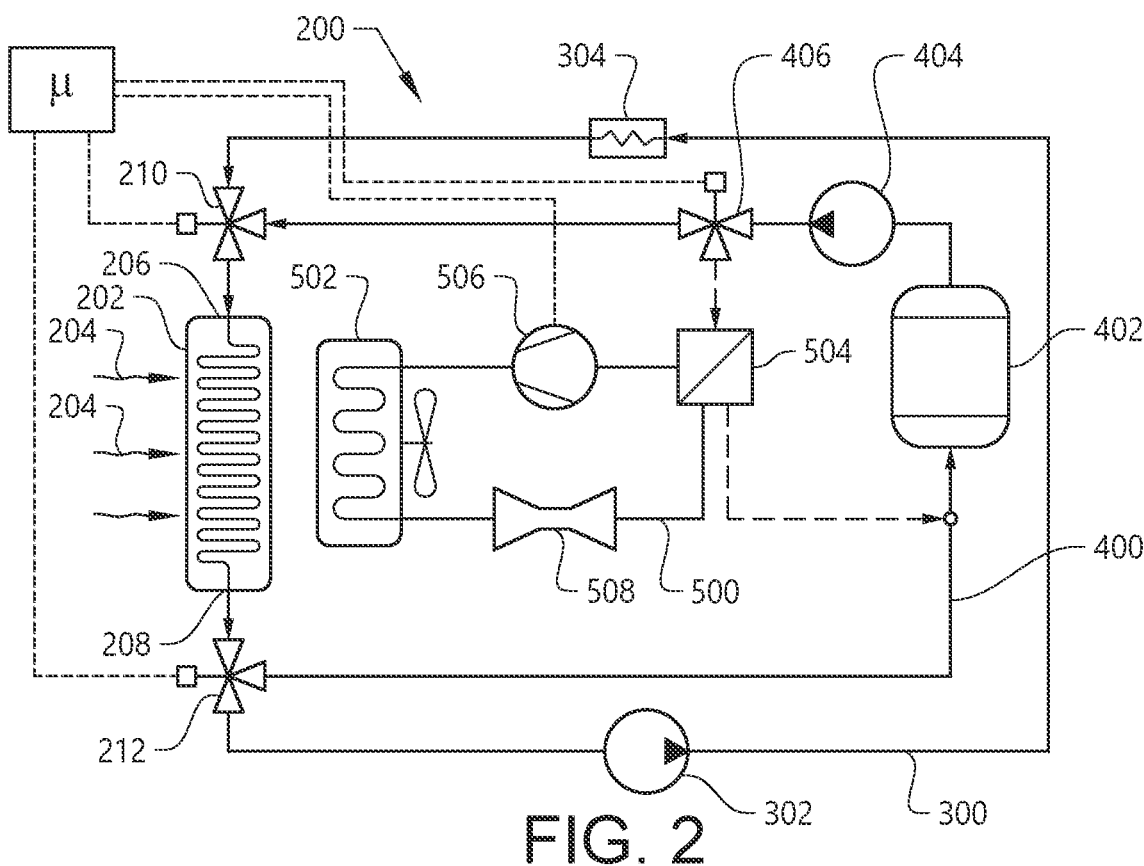
FIG. 2 is a schematic illustration of the cooling system according to an example embodiment.

In order to describe the cooling system in further detail, reference is made to FIG. 2 which is a schematic illustration of a cooling system 200 according to an example embodiment. The cooling system 200 comprises a radiator 202 through which ambient air 204 flows. The radiator 202 comprises a radiator inlet 206 and a radiator outlet 208. The radiator inlet 206 is connected to a first radiator valve 210 and the radiator outlet 208 is connected to a second radiator valve 212. As can be seen in FIG. 2, both the first 210 and second 212 radiator valves are formed by a respective three-way valve.

The cooling system 200 further comprises a first cooling circuit 300 arranged between the first 210 and second 212 radiator valves. In detail, a flow of fluid, preferably air, is supplied through the first cooling circuit 300 from the radiator outlet 208, via the second radiator valve 212, to the radiator inlet 206, via the first radiator valve 210. The first fluid circuit 300 comprises a first fluid pump 302 and a heat generating arrangement 304. According to the example embodiment of FIG. 2, the heat generating arrangement 304 is arranged in downstream fluid communication with the first fluid pump 302 as seen in the flow direction from the radiator outlet 208 to the radiator inlet 206.

The cooling system 200 also comprises a second fluid circuit 400 connected between the first 210 and second 212 radiator valves. The second fluid circuit 400 comprises an electric heat source 402. Although not to be construed as limited to the scope of the present invention, the electric source 402 will in the following be referred to as a fuel cell system 402. The second fluid circuit 400 further comprises a heat source pump 404 and a second circuit valve arrangement 406. The heat source pump 404 and the second circuit valve arrangement 406 are arranged between the fuel cell system 402 and the first radiator valve 210. Preferably, and as depicted in FIG. 2, the heat source pump 404 is arranged in fluid communication between the fuel cell system 402 and the second circuit valve arrangement 406.

The cooling system 200 also comprises a third fluid circuit 500. The third fluid circuit 500 comprises a refrigerant fluid, i.e. the refrigerant fluid circulates and flows through the third fluid circuit 500. The third fluid circuit 500 comprises a condenser 502, a heat exchanger 504, and a compressor arrangement 506. The condenser 502 is connected in proximity with the radiator 202 and arranged to exchange heat with the ambient air, preferably received from the radiator 202. According to the example depicted in FIG. 2, the third fluid circuit 500 also comprises an expander 508 arranged in fluid communication between the condenser 502 and the heat exchanger 504.

As also depicted in FIG. 2, the heat exchanger 504 is connected to the second circuit valve arrangement 406 as well to the second fluid circuit 400. In detail, the heat exchanger 504 is connected to the second fluid circuit 400 at a position between the second radiator valve 212 and the fuel cell system 402. Hereby, the heat exchanger 504 is able to receive fluid from the second fluid conduit 400 via the second circuit valve arrangement 406 and to supply heat exchanged fluid to the second fluid circuit 400 before the flow reaches the fuel cell system 402, i.e. provided to the second fluid circuit 400 at a position upstream the fuel cell system 402. A flow of fluid will thus be able to circulate through the fuel cell system 402 and the heat exchanger 504.

As can be seen in FIG. 2, the above described control unit 114 is connected to the first radiator valve 210, the second radiator valve 212, the second circuit valve arrangement 406 and to the compressor arrangement 506. Hereby, the control unit 114 can control operation of these components.

The following will describe the functional operations of the cooling system 200 when operated in three different operating modes. The operating modes described in the following are a normal vehicle operating mode, a vehicle braking mode, and a vehicle start-up mode. The cooling system 200 is controlled to operate in the normal vehicle operating mode when the fuel cell system 402 is requiring continuous cooling when operating the vehicle in a more or less steady-state operation. Hence, no excessive heating or cooling of the fuel cell system 402 is required. Furthermore, in the normal vehicle operating mode, a fluid is circulated through fuel cell system 402 by the heat source pump 404 and the fuel cell system 402 is kept in fluid communication with the radiator 202. The second circuit valve arrangement 406 is configured to allow the direction of a fluid flow from the fuel cell system 402 to the first radiator valve 210. The cooling system 200 is hereby not supplying fluid flow through the heat generating arrangement 304. The vehicle braking mode is on the other hand an operating mode when the vehicle is reducing the vehicle speed, or when the vehicle is braking for maintaining a desired vehicle speed. The vehicle start-up mode is an operating mode where the vehicle is started after having been standing still for a predetermined time period. The vehicle start-up mode may also relate to a situation where the electric heat source has a relatively low temperature and is in need of heating for being able to operate at an optimum operation point.

During the normal vehicle operating mode, control unit 214 controls the first 210 and second 212 radiator valves to direct a flow of fluid through the second fluid circuit 400, i.e. from the radiator 202 to the fuel cell system 402 and further back to the radiator 202. At the same time, the first 210 and second 212 radiator valves are controlled to prevent the flow of fluid from the radiator 202 to enter the first fluid circuit 300. Also, the refrigerant in the third fluid circuit 500 is controlled to not flow through the heat exchanger 504. This is preferably controlled by turning off the compressor arrangement 506, or inactivating the compressor arrangement 506. Also, the control unit 114 controls the second circuit valve arrangement 406 to prevent fluid from the fuel cell system 402 to enter the heat exchanger 504.

Figure 3:
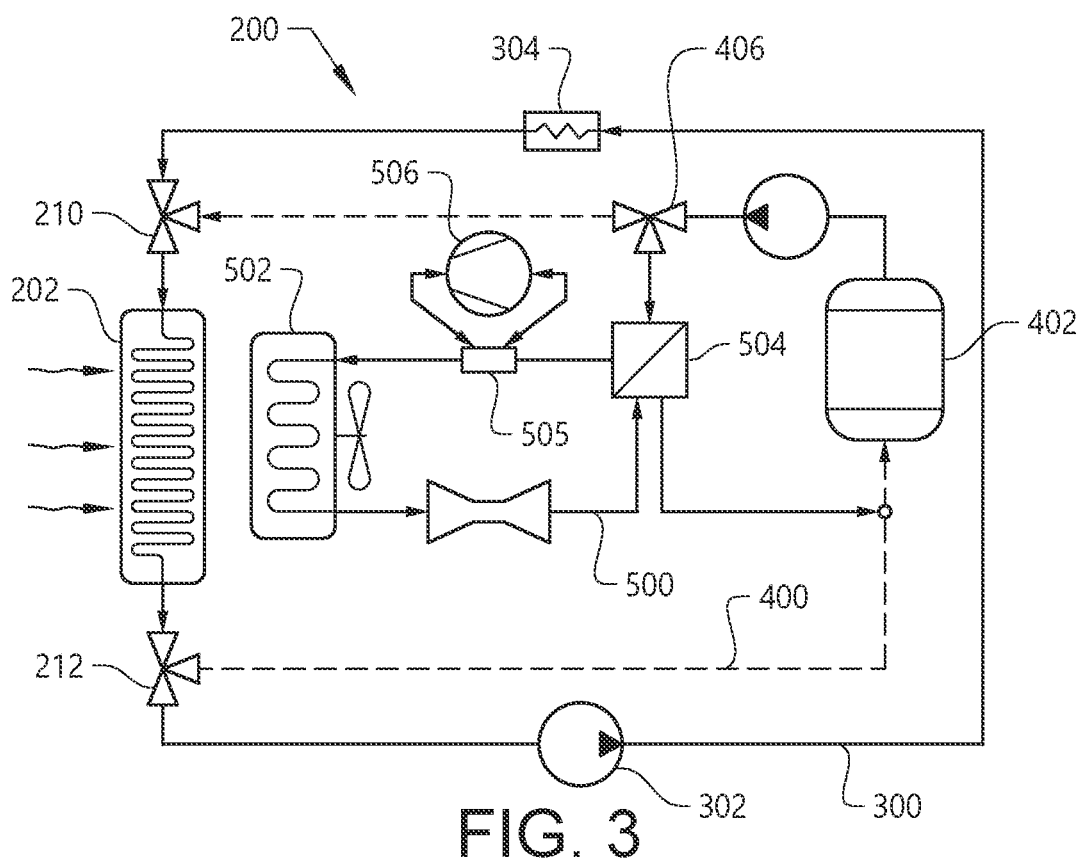
FIG. 3 is a schematic illustration of the cooling system according to another example embodiment.

In order to describe the vehicle braking mode in further detail, reference is made to FIG. 3. The bold lines in FIG. 3 illustrate the flow direction for the active fluid flow during the vehicle braking mode, while the dashed lines illustrate the non-active conduits.

In FIG. 3, and throughout the following description, the compressor arrangement 506 comprises a reversing valve arrangement 505. The reversing valve arrangement 505 is also connected, and controlled by the control unit 114 illustrated in FIG. 2. As can be seen, the reversing valve arrangement 505 is positioned in the third fluid circuit 500 and in arranged in fluid communication between the heat exchanger 504 and the condenser 502. The reversing valve arrangement 505 is arranged to control the flow of refrigerant fluid in the third fluid circuit 500 to be either directed in the direction from the condenser 502 to the heat exchanger 504

During the vehicle braking mode, the first 210 and second 212 radiator valves are controlled to direct the fluid from the radiator 202 to the first fluid circuit 300, while at the same time preventing fluid from the radiator 202 to enter the second fluid conduit 400. Hence, fluid from the radiator 202 is circulated through the first pump 302 and the heat generating arrangement 304. At the same time, the compressor arrangement 506 is, by means of the reversing valve arrangement 505, controlled to flow the refrigerant in the third fluid conduit 500 from the heat exchanger 504 to the condenser 502. Also, the second circuit valve arrangement 406 is controlled to direct the fluid, also referred to as heat source fluid, in the second fluid conduit through the heat exchanger 504. The heat source fluid is supplied into the fuel cell system 402 from the heat exchanger 504. Hence, the heat source fluid is controlled to circulated through the heat exchanger 504 and the fuel cell system 402.

Figure 4:
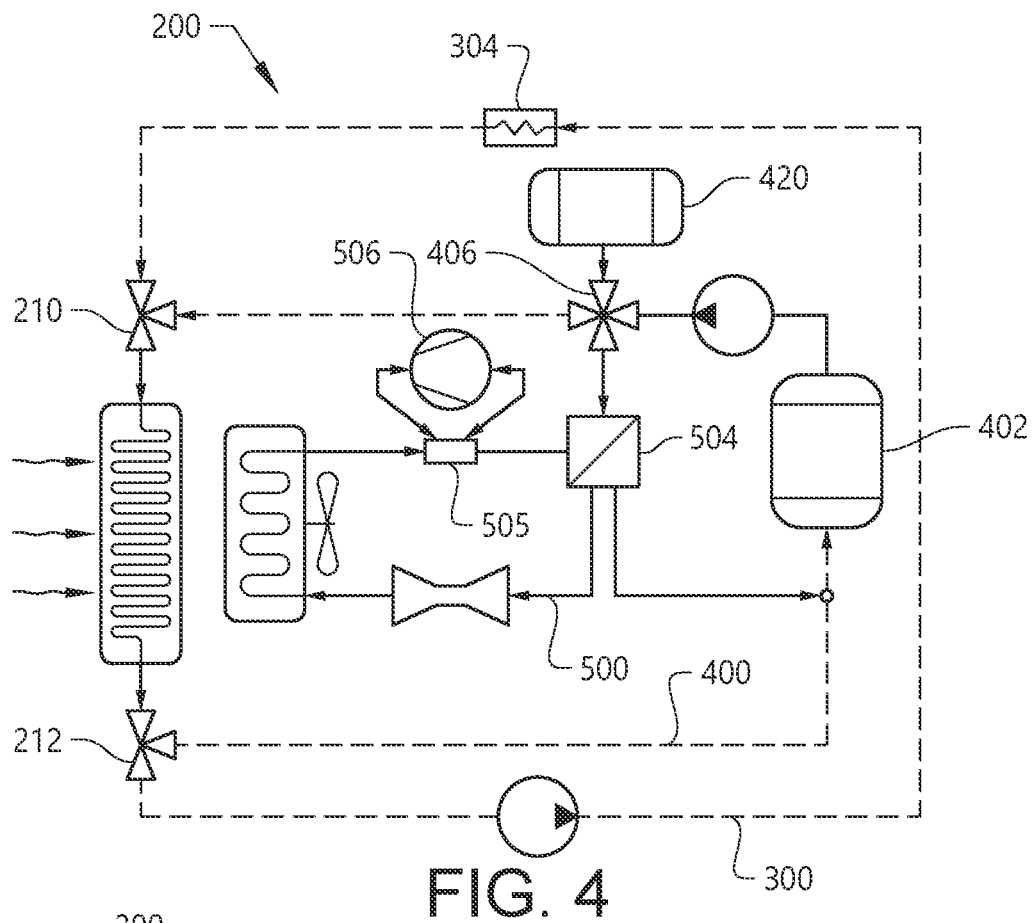
FIG. 4 is a schematic illustration of the cooling system according to another example embodiment.

In order to describe the vehicle start-up mode, reference is now made to FIG. 4. In a similar vein as for FIG. 3, the bold lines in FIG. 4 illustrate the flow direction for the active fluid flow during the vehicle start-up mode, while the dashed lines illustrate the non-active conduits. During the vehicle start-up mode, the first 210 and second 212 radiator valves are closed, thus preventing a flow of fluid from entering the first fluid conduit 300 as well as the second fluid conduit 400. The second circuit valve arrangement 406 is controlled in the same way as during the vehicle braking mode, i.e. controlled to direct the heat source fluid, in the second fluid conduit through the heat exchanger 504. The heat source fluid is supplied into the fuel cell system 402 from the heat exchanger 504. Hence, the heat source fluid is controlled to circulated through the heat exchanger 504 and the fuel cell system 402. Also, the compressor arrangement 506 is, by means of the reversing valve arrangement 505, controlled to flow the refrigerant in the third fluid conduit 500 from the condenser 502 to the heat exchanger 504, i.e. the opposite direction compared to the refrigerant flow direction during the vehicle braking mode.

As can be seen in FIG. 4, the cooling system 200 also comprises a fluid tank 420 fluidly connected to the second circuit valve arrangement 406. The fluid tank 420 can of course also be included in the embodiments depicted in FIGS. 2 and 3, as well as in all of the other following embodiments that will be described below. During the vehicle start-up mode, the fluid present in the fluid tank 420 is controlled to be supplied to the heat exchanger 504. In further detail, the second circuit valve arrangement 406 is controlled to direct a flow of fluid from the fluid tank 420 to the heat exchanger 504.

Figure 5:
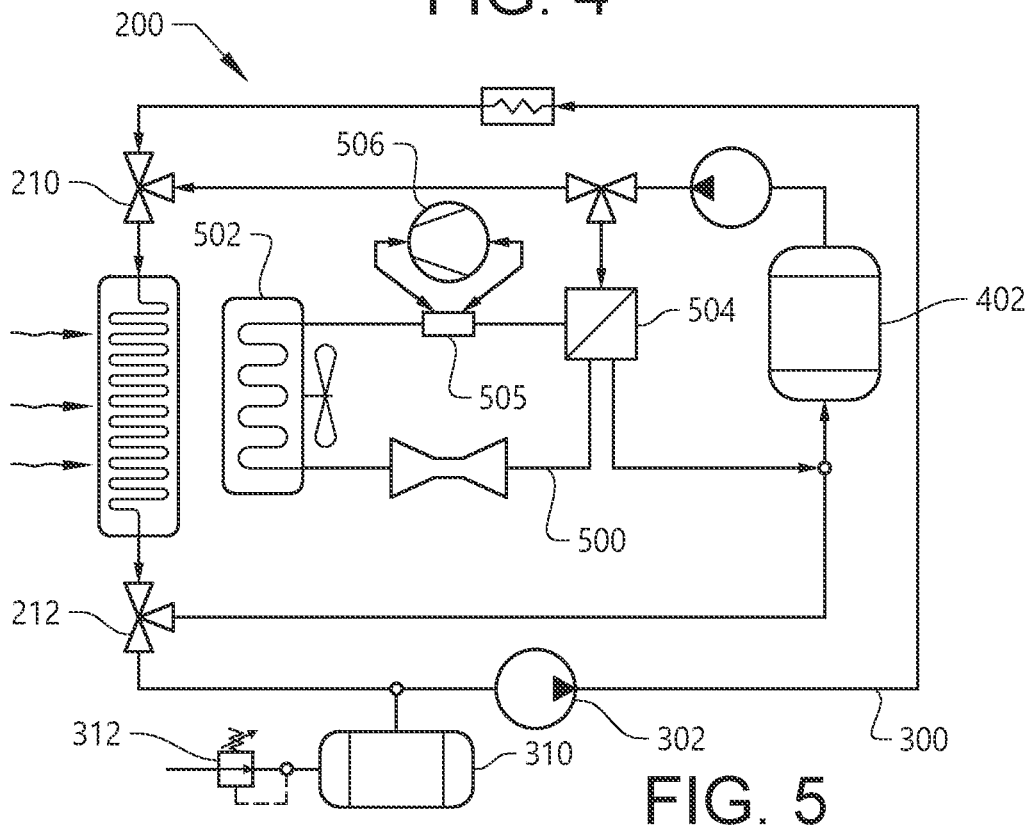
FIG. 5 is a schematic illustration of the cooling system according to another example embodiment.

In order to describe the cooling system according to another example embodiment, reference is now made to FIG. 5. The following will only describe the features in the example embodiment of FIG. 5 that differs from the features described above in relation to the example embodiments of FIGS. 2-4. Although not depicted in FIG. 5, this embodiment also comprises the above described control unit 114 connected to the same components as in the FIG. 2 embodiment.

The cooling system 200 exemplified in FIG. 5 also comprises a pressurized coolant tank 310 connected to the first fluid circuit 300. Although not illustrated, the pressurized coolant tank 310 can also, or instead, be connected to the second fluid circuit 400. Further, the pressurized coolant tank 310 is connected to a pressure control valve 312 arranged to controllably allow pressurized fluid into the pressurized coolant tank 310. The pressurized coolant tank 310 may hence be connected to a source of pressurized fluid of the vehicle. The pressurized coolant tank 310 is connected to the first fluid conduit 300 at a position between the second radiator valve 212 and the first pump 302.

The pressurized coolant tank 310 is preferably used in connection with the vehicle braking mode. During the vehicle braking mode, the pressurized coolant tank 310 supplies a flow of pressurized coolant flow to the first fluid circuit 300 at the position between the second radiator valve 212 and the first pump 302.

Figure 6:
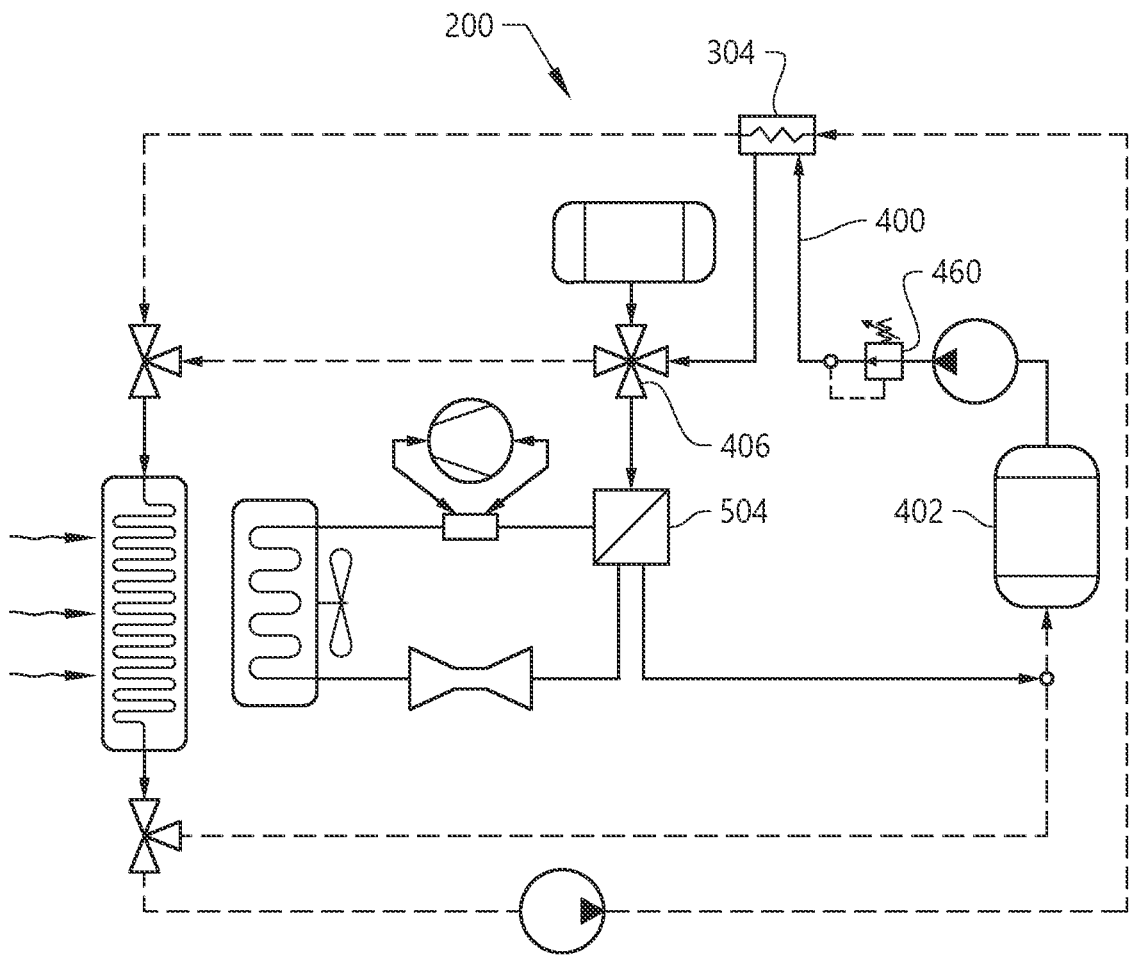
FIG. 6 is a schematic illustration of the cooling system according to another example embodiment.

Turning to FIG. 6, which is a schematic illustration of the cooling system according a further example embodiment. The embodiment depicted in FIG. 6 is particularly useful when operating the cooling system 200 in the vehicle start-up mode. In a similar vein as above, the active conduits are illustrated with bold lines and the non-active conduits are illustrated with dashed lines.

As can be seen in FIG. 6, the second fluid circuit 400 further comprises an additional valve arrangement 460 connected between the fuel cell system and the heat generating arrangement 304. Further, the heat generating arrangement 304 is also connected to the second circuit valve arrangement 406. During the vehicle start-up mode, the additional valve arrangement 460 is arranged to direct the heat source fluid in the second fluid circuit 400 from the fuel cell system 402 to circulate through the heat exchanger 504 via the heat generating arrangement 304.

Figure 7:
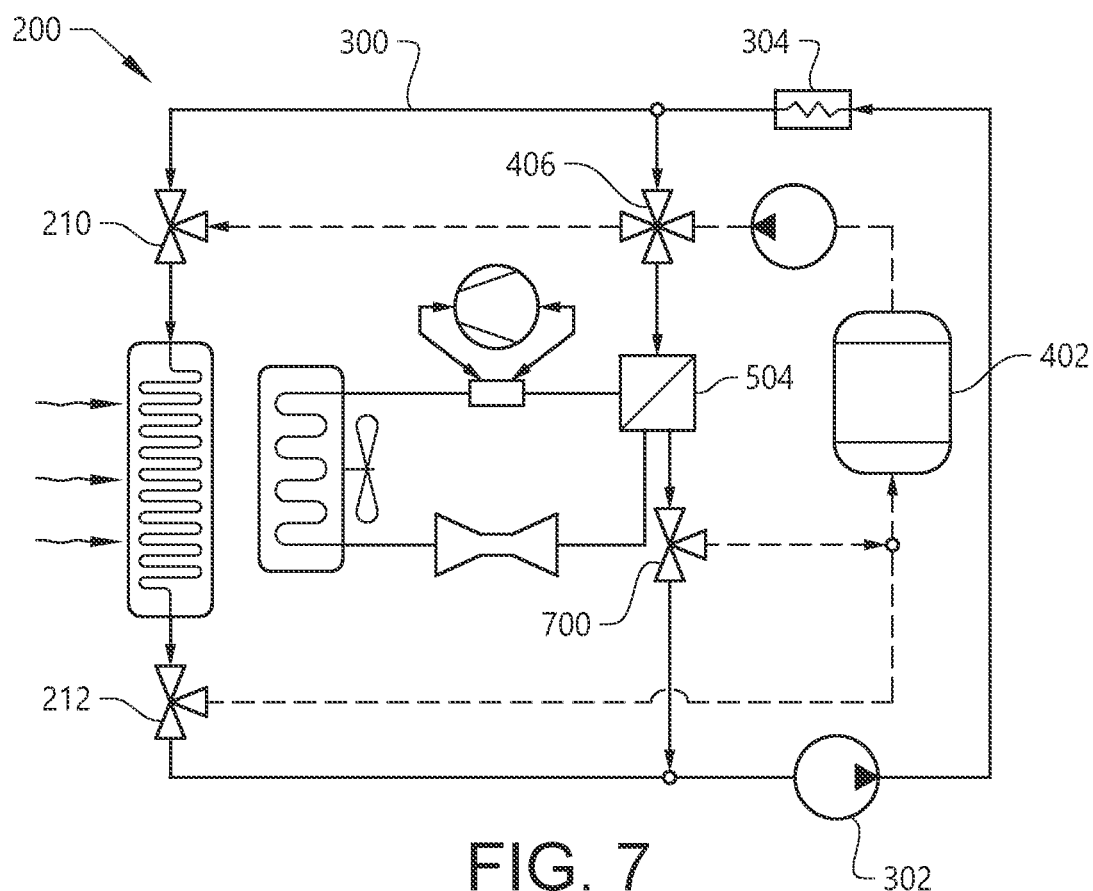
FIG. 7 is a schematic illustration of the cooling system according to another example embodiment.

Reference is now made to FIG. 7 in order to describe the cooling system according to a still further example embodiment. The embodiment depicted in FIG. 7 is particularly useful when operating the cooling system 200 in the vehicle braking mode. In a similar vein as above, the active conduits are illustrated with bold lines and the non-active conduits are illustrated with dashed lines.

As can be seen in FIG. 7, the second circuit valve arrangement 406 is connected to the first fluid circuit 300. In detail, the second circuit valve arrangement 406 is connected to the first fluid circuit 300 at a position between the heat generating arrangement 304 and the first radiator valve 210. In the FIG. 7 embodiment, the cooling system 200 also comprises a heat exchanger valve 700. The heat exchanger valve 700 is arranged to fluidly connect the heat exchanger 504 to the fuel cell system 402 as well as to the first fluid conduit 300. In detail, the heat exchanger valve 700 is connected to the first fluid circuit 300 at a position between the second radiator valve 212 and the heat generating arrangement 304. As depicted in FIG. 7, the heat exchanger valve 700 is connected to the first fluid circuit 300 at a position between the second radiator valve 212 and the first fluid pump 302.

During the vehicle braking mode, the second circuit valve arrangement 406 is controlled to direct a portion of the flow of fluid from the heat generating arrangement 304 to the heat exchanger 504. Also, the heat exchanger valve 700 is controlled to exhaust the portion of the flow of fluid to the first fluid circuit 300 to the position upstream the first fluid pump 302.

As indicated above, the features of the various embodiments described herein are combinable. Thus, although each figure illustrates separate features, these separate features can be combined in any suitable manner.

Figure 8:
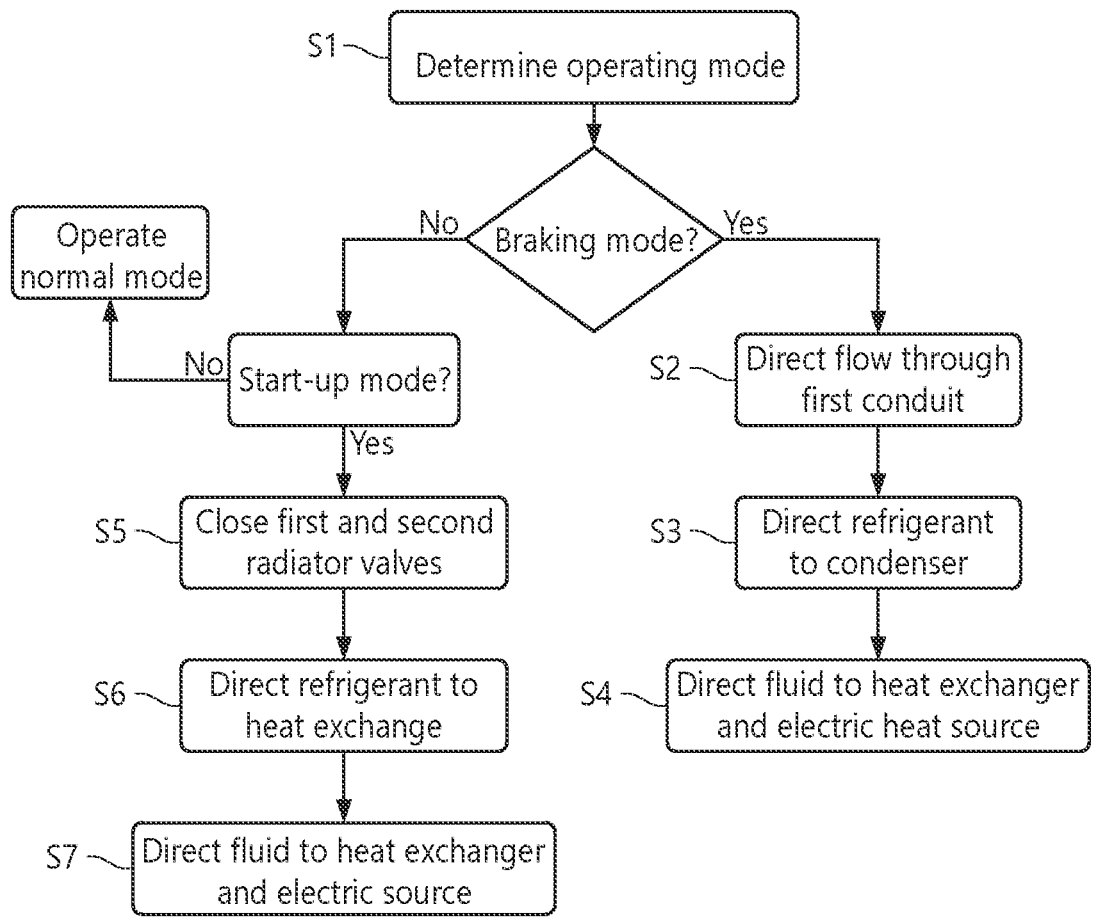
FIG. 8 is a flow chart of a method of controlling the cooling system according to an example embodiment.

In order to sum up, reference is made to FIG. 8 which is a flow chart of a method for controlling the above described cooling system 200 according to an example embodiment. Firstly, the control unit determines S1 a vehicle operating mode for the vehicle 10. If the vehicle operating mode is a vehicle braking mode, the first 210 and second 212 radiator valves are controlled S2 to direct the fluid from the radiator 202 to the first fluid circuit 300, while at the same time preventing fluid from the radiator 202 to enter the second fluid conduit 400. Also, the compressor arrangement 506 is, preferably by means of the reversing valve arrangement 505, controlled S3 to flow the refrigerant in the third fluid conduit 500 from the heat exchanger 504 to the condenser 502. At substantially the same time, the second circuit valve arrangement 406 is controlled S4 to direct the heat source fluid in the second fluid conduit through the heat exchanger 504. The heat source fluid is supplied into the fuel cell system 402 from the heat exchanger 504. Hence, the heat source fluid is controlled to circulated through the heat exchanger 504 and the fuel cell system 402.

If the control unit on the other hand determines that the vehicle operating mode is a vehicle start-up mode, the first 210 and second 212 radiator valves are closed S5, thus preventing a flow of fluid from entering the first fluid conduit 300 as well as the second fluid conduit 400. Also, the compressor arrangement 506 is, preferably by means of the reversing valve arrangement 505, controlled S6 to flow the refrigerant in the third fluid conduit 500 from the condenser 502 to the heat exchanger 504, i.e. the opposite direction compared to the refrigerant flow direction during the vehicle braking mode. At substantially the same time, the second circuit valve arrangement 406 is controlled in the same way as during the vehicle braking mode, i.e. controlled to direct the heat source fluid, in the second fluid conduit through the heat exchanger 504. The heat source fluid is supplied into the fuel cell system 402 from the heat exchanger 504. Hence, the heat source fluid is controlled to circulated through the heat exchanger 504 and the fuel cell system 402.

If the vehicle operating mode is neither the vehicle braking mode nor the vehicle start-up mode, the vehicle is most likely in the normal vehicle operating mode. In such a case, the control unit 214 controls the first 210 and second 212 radiator valves to direct a flow of fluid through the second fluid circuit 400, i.e. from the radiator 202 to the fuel cell system 402 and further back to the radiator 202. At the same time, the first 210 and second 212 radiator valves are controlled to prevent the flow of fluid from the radiator 202 to enter the first fluid circuit 300. Also, the refrigerant in the third fluid circuit 500 is controlled to not flow through the heat exchanger 504. This is preferably controlled by turning off the compressor arrangement 506, or inactivating the compressor arrangement 506. Also, the control unit 114 controls the second circuit valve arrangement 406 to prevent fluid from the fuel cell system 402 to enter the heat exchanger 504.

It is to be understood that the present disclosure is not limited to the embodiments described above and illustrated in the drawings; rather, the skilled person will recognize that many changes and modifications may be made within the scope of the appended claims.

The invention claimed is:

1. A cooling system for a vehicle propelled by an electric machine, wherein the cooling system comprises:

a radiator configured to receive ambient air, the radiator comprises a radiator inlet connected to a first radiator valve, and a radiator outlet connected to a second radiator valve, a first fluid circuit comprising a first pump and a heat generating arrangement, the first fluid circuit being arranged in fluid communication between the first radiator valve and the second radiator valve, a second fluid circuit arranged in fluid communication between the first radiator valve and the second radiator valve, the second fluid circuit comprising an electric heat source, and a second circuit valve arrangement arranged in fluid communication between the electric heat source and the inlet of the radiator, and a third fluid circuit configured to contain a refrigerant fluid, the third fluid circuit comprising a condenser configured to exchange heat with ambient air, a heat exchanger, and a compressor arrangement, wherein the heat exchanger is fluidly connected to the second circuit valve arrangement and to the second fluid circuit at a position between the electric heat source and the outlet of the radiator, wherein the cooling system further comprises a control unit connected to the first radiator valve, the second radiator valve, the second circuit valve arrangement and to the compressor arrangement, the control unit comprising control circuitry configured to:

receive a signal indicative of a vehicle operation mode, and when the vehicle operation mode is the vehicle braking mode:

control the first and second radiator valves to direct a flow of fluid from the radiator through the first fluid circuit and prevent the flow of fluid from the radiator to enter the second fluid circuit, control the compressor arrangement to flow the refrigerant in a direction from the heat exchanger to the condenser, and control the second circuit valve arrangement to direct a heat source fluid to circulate through the heat exchanger and the electric heat source.

2. The cooling system according to claim 1, wherein the compressor arrangement comprises a reversing valve arrangement connected to the control unit, wherein the reversing valve arrangement is arranged in the third fluid circuit in fluid communication between the heat exchanger and the condenser.

3. The cooling system according to claim 1, wherein the control circuitry is, when the vehicle operation mode is a vehicle start-up mode, further configured to:

control the first and second radiator valves to be arranged in a closed position, respectively, to prevent the flow of fluid from the first and second fluid circuits to flow into the radiator, control the compressor arrangement to flow the refrigerant in a direction from the condenser to the heat exchanger, and control the second circuit valve arrangement to direct the fluid contained in the second circuit conduit to circulate through the heat exchanger and the electric heat source.

4. The cooling system according to claim 1, wherein the third fluid conduit further comprises an expander arranged in fluid communication between the condenser and the heat exchanger, the expander being arranged on an opposite side of the heat exchanger compared to the compressor arrangement.

5. The cooling system according to claim 1, wherein the second fluid circuit further comprises a heat source pump arranged in fluid communication between the electric heat source and the second circuit valve arrangement.

6. The cooling system according to claim 1, wherein the second fluid circuit further comprises an additional valve arrangement connected between the electric heat source and the heat generating arrangement, wherein the heat generating arrangement is further connected to the second circuit valve arrangement.

7. The cooling system according to claim 6, wherein the control circuitry is, when the vehicle operation mode is the vehicle start-up mode, further configured to:
   control the additional valve arrangement to direct the heat source fluid from the electric heat source to circulate through the heat exchanger via the heat generating arrangement.

8. The cooling system according to claim 1, wherein the cooling system further comprises a pressurized coolant tank connected to at least one of the first fluid circuit and the second fluid circuit.

9. The cooling system according to claim 8, wherein the pressurized coolant tank is configured to supply a flow of pressurized coolant flow to the first fluid circuit when the pressurized coolant tank is connected to the first fluid circuit and when the control circuits receives the signal indicative of the vehicle braking mode, the flow of pressurized coolant flow is provided to the first fluid circuit at a position upstream the heat generating arrangement.

10. The cooling system according to claim 1, wherein the first fluid circuit comprises a first fluid circuit valve arranged in fluid communication between the heat generating arrangement and the first radiator valve, the first fluid circuit valve comprising an adjustable diameter for controlling a pressure level in the first fluid circuit.

11. The cooling system according to claim 1, wherein the second circuit valve arrangement is further connected to the first fluid circuit at a position between the heat generating arrangement and the first radiator valve.

12. A vehicle comprising a cooling system according to claim 1.

* * * * *